(12) United States Patent
Fang (10) Patent No.: US 9,036,905 B2
(45) Date of Patent: May 19, 2015

(54) TRAINING CLASSIFIERS FOR DEBLURRING IMAGES

(71) Applicant: Google Inc., Mountain View, CA (US)

(72) Inventor: Hui Fang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/483,422

(22) Filed: Sep. 11, 2014

(65) Prior Publication Data

US 2015/0030239 A1 Jan. 29, 2015

Related U.S. Application Data

(63) Continuation of application No. 13/682,637, filed on Nov. 20, 2012, now Pat. No. 8,861,884.

(60) Provisional application No. 61/562,319, filed on Nov. 21, 2011.

(51) Int. Cl.
*G06K 9/62* (2006.01)
*G06T 5/00* (2006.01)
*G06K 9/46* (2006.01)

(52) U.S. Cl.
CPC .............. *G06T 5/003* (2013.01); *G06K 9/4609* (2013.01); *G06K 9/6256* (2013.01); *G06K 9/627* (2013.01); *G06T 2207/20081* (2013.01); *G06T 2207/20201* (2013.01)

(58) Field of Classification Search
CPC ........... G06T 1/007; G06T 5/00; G06T 5/003; G06T 5/10; G06T 5/20; G06T 5/50; G06T 2207/20056; G06T 2207/20081; G06T 2207/20201; G06T 2207/20221; H04N 1/387; H04N 1/4092; H04N 1/58; H04N 1/6058; H04N 5/208; H04N 5/21; H04N 5/23254; H04N 5/23267; H04N 5/23277; H04N 5/2355
See application file for complete search history.

(56) References Cited

U.S. PATENT DOCUMENTS

| 7,437,012 B2 | 10/2008 | Carasso |
| 7,884,854 B2 | 2/2011 | Banner et al. |
| 8,390,704 B2 | 3/2013 | Wang et al. |
| 8,576,289 B2 | 11/2013 | Ishii et al. |

(Continued)

OTHER PUBLICATIONS

Ben-Ezra, M., et al., "Motion-based motion deblurring," IEEE Transactions on Pattern Analysis and Machine Intelligence, 2004, pp. 689-698, vol. 26.

(Continued)

*Primary Examiner* — Jose Couso (57) ABSTRACT

A classifier training system trains a classifier for evaluating image deblurring quality using a set of scored deblurred images. In some embodiments, the classifier training system trains the classifier based on a number of sub-images extracted from the scored deblurred images. An image deblurring system applies a number of different deblurring transformations to a given blurry reference image and uses the classifier trained by the classifier training system to evaluate deblurring quality, thereby finding a highest-quality deblurred image. In some embodiments, the classifier training system trains the classifier in the frequency domain, and the image deblurring system uses the classifier trained by the classifier training system to evaluate deblurring quality in the frequency domain. In some embodiments, the image deblurring system applies the different deblurring transformations iteratively.

20 Claims, 5 Drawing Sheets

(56) References Cited

U.S. PATENT DOCUMENTS 8,600,187 B2    12/2013  Ishii
8,861,884 B1 *  10/2014  Fang .............................. 382/255

OTHER PUBLICATIONS

Cho, S., et al., "Fast motion deblurring," In ACM SIGGRAPH Asia 2009 papers, SIGGRAPH Asia '09, pp. 145:1-145:8, New York, NY, USA, 2009. ACM.

Chung, Y.-C., et al., A non-parametric blur measure based on edge analysis for image processing applications. Cybernetics and Intelligent Systems, 2004 IEEE Conference on, 1:356-360, 2004.

Dai, S., et al., "Motion from blur," IEEE In Proc. Conf. Computer Vision and Pattern Recognition, 2008, pp. 1-8.

Fergus, R., et al., "Removing camera shake from a single photograph," In ACM SIGGRAPH 2006 Papers, SIGGRAPH '06, 2006, pp. 787-794, New York, NY, USA, ACM.

Field, D. J., What is the goal of sensory coding?, Neural Computation, Jul. 1994, pp. 559-601, vol. 6.

Freund, Y., et al., "A Decision-Theoretic Generalization of On-Line Learning and an Application to Boosting," Journal of Computer and System Sciences, 1997, pp. 119-139, vol. 55.

Freund, Y., et al., "An efficient boosting algorithm for combining preferences," J. Mach. Learn. Res., Dec. 2003, pp. 933-969, vol. 4.

Gupta, A., et al., "Single image deblurring using motion density functions," In ECCV '10: Proceedings of the 10th European Conference on Computer Vision, 2010, pp. 171-184, LNCS 6311.

Hirsch, M., et al., "Efficient filter flow for space-variant multiframe blind deconvolution," IEEE Computer Society Conference on Computer Vision and Pattern Recognition, 2010, pp. 607-614.

Joshi, N., et al., "Image deblurring using inertial measurement sensors," In ACM SIGGRAPH 2010 papers, SIGGRAPH '10, 2010, pp. 30:1-30:9, New York, NY, USA, ACM.

Krishnan, D., et al., "Fast image deconvolution using hyper-laplacian priors," In NIPS, 2009, pp. 1033-1041.

Kundar, D., et al., "Blind image deconvolution: An algorithmic approach to practical image restoration," IEEE Signal Processing Magazine, May 1996, pp. 43-64.

Lazebnik, S., et al., "Beyond bags of features: Spatial pyramid matching for recognizing natural scene categories," In CVPR '06: Proceedings of the 2006 IEEE Computer Society Conference on Computer Vision and Pattern Recognition, 2006, pp. 2169-2178, Washington, DC, USA.

Levin, A., "Blind motion deblurring using image statistics," Advances in Neural Information Processing Systems 19, In NIPS, 2006, pp. 841-848.

Levin, A., et al., "Efficient marginal likelihood optimization in blind deconvolution," In CVPR, 2011, pp. 2657-2664. IEEE.

Liang, L., et al., "A no-reference perceptual blur metric using histogram of gradient profile sharpness," In ICIP, 2009, pp. 4369-4372, IEEE.

Liu, R., et al., Image partial blur detection and classification. IEEE Computer Society Conference on Computer Vision and Pattern Recognition, 2008, pp. 1-8.

Room, F., "Estimating image blur in the wavelet domain," Image Rochester NY, 2002, p. IV-4190, vol. 1.

Shan, Q., et al., "High-quality motion deblurring from a single image," In ACM SIGGRAPH 2008 papers, SIGGRAPH '08, pp. 73:1-73:10, New York, NY, USA, 2008. ACM.

Tai, Y.-W., et al., "Image/video deblurring using a hybrid camera," Computer Vision and Pattern Recognition, IEEE Computer Society Conference on, 2008, pp. 1-8.

Whyte, 0., et al., "Non-uniform deblurring for shaken images," In Proceedings of the IEEE Conference on Computer Vision and Pattern Recognition, 2010, pp. 491-498.

* cited by examiner

TRAINING CLASSIFIERS FOR DEBLURRING IMAGES

CROSS-REFERENCE TO RELATED APPLICATIONS

This application is a continuation of U.S. application Ser. No. 13/682,637, filed Nov. 20, 2012, which claims the benefit of Provisional Application No. 61/562,319, filed Nov. 21, 2011, which is hereby incorporated herein by reference.

BACKGROUND

1. Field of Art

The disclosure generally relates to the field of image processing, and more specifically to training classifiers for deblurring images.

2. Description of the Related Art

Recent advances in image capture technology have led to a proliferation of camera devices, and in turn, to a large increase in the number of digital photos produced by users. However, many cameras, such as the cameras in cellular and smart phones, do not have sophisticated mechanical or electrical focusing and stabilizing mechanisms. As a result, many captured images will be blurry, leading to decreased user satisfaction with the images.

Existing techniques for image deblurring suffer from various shortcomings. For example, some techniques require users to manually select and test multiple parameters used by associated deblurring algorithms, which is inconvenient for the users. Further, existing techniques are computationally intensive, and are therefore unable to deblur images in acceptable time periods for users.

SUMMARY

This disclosure relates to a system and method for training a classifier for determining a measure of quality of a deblurred image. The classifier is trained by applying a plurality of deblur transformations to a plurality of blurry references images producing a plurality of deblurred images. Each of the deblurred images is scored with respect to its reference image to determine a quality of the deblurring. From each deblurred image, an image feature vector characterizing one or more visual aspects of the image is extracted, for example, features of the frequency aspects of the image. The classifier is then trained based on the image feature vectors from the deblurred images and the corresponding scores of the deblurred images, learning the image features vectors that indicate a well deblurred image.

Once the classifier is trained, it can be used to identify a best deblurred image from an input image. A given blurred images is accessed and processed using the plurality of deblurring transformations to produce a plurality of candidate deblurred images. The image feature vectors of the candidate deblurred images are extracted, and used as inputs to the classifier. The classifier produces as output a score of deblurring quality of each candidate deblurred image. This allows the classifier to select a "best" candidate deblurred image from the plurality of deblurred images.

The classifier is used in a system and method for deblurring images. A blurry image is deblurred by identifying an initial deblurring kernel based on the blurry image. First and second perturbed deblurring kernels are generated based on the initial deblurring kernel. The perturbed deblurring kernels are applied to the blurry image to produce a first and second deblurred image, respectively. In some embodiments, the first and second deblurred images are produced in the frequency domain. The classifier is applied to the first and second deblurred images to determine a first and second deblurring score, respectively. In some embodiments, a third perturbed deblurring kernel is generated based on the first and second perturbed deblurring kernels and the first and second deblurring scores. The third perturbed deblurring kernel is applied to the blurry image to produce a third deblurred image, which is scored by the classifier to determine a third deblurring score. Based on the determined deblurring scores, the best perturbed deblurring kernel is selected as the deblurring kernel. In some embodiments, the deblurring kernel is applied to the blurry image to produce the best deblurred image.

Many additional features and advantages will be apparent to one of ordinary skill in the art in view of the drawings, specification, and claims hereof.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG.) 1 is a block diagram of a classifier training system, according to one embodiment.

DETAILED DESCRIPTION

A classifier training system trains a classifier for evaluating image deblurring quality using a set of scored deblurred images and a set of feature vectors extracted from the deblurred images. An image deblurring system deblurs a blurry image while using the classifier trained by the classifier training system by applying a number of different deblurring transformations to the blurry image to produce candidate deblurred images, and using the classifier to evaluate deblurring quality of each candidate image, thereby finding a highest-quality deblurred image. In some embodiments, the classifier training system and the image deblurring system are part of the same system. In some embodiments, the classifier training system trains the classifier in the frequency domain, and the image deblurring system uses the classifier trained by the classifier training system to evaluate deblurring quality in the frequency domain.

Figure 1:
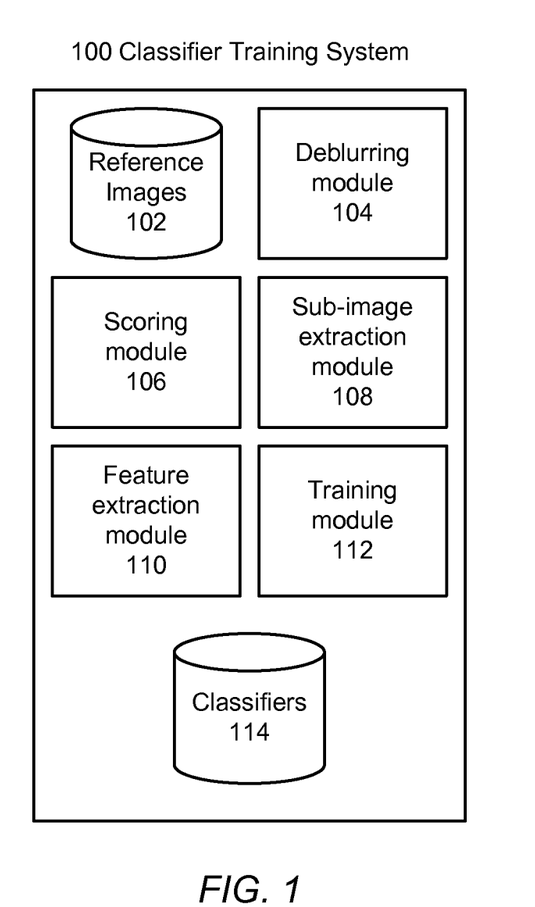

FIG. 1 illustrates a block diagram of a classifier training system 100, according to one embodiment. The classifier training system receives as input a set of blurry images (hereinafter referred to as the "reference images"), and produces as output an image deblurring classifier that quantifies deblurring quality. This process is illustrated later with reference to FIG. 3. The classifier training system 100 comprises a reference images store 102, a deblurring module 104, a scoring module 106, a sub-image extraction module 108, a feature extraction module 110, a training module 112, and image deblurring classifiers 114 produced by the training module.

The references images in the image store 102 are sent to the deblurring module 104, where they are deblurred. The deblurred images are scored by the scoring module 106. The sub-image extraction module 108 extracts sub-images from the scored images. The feature extraction module 110 extracts features from the scored sub-images, and the training module 112 trains an image deblurring classifier 114 based on the extracted features from the feature extraction module and the scores from the scoring module 106. The components of the classifier training system are now described in additional detail.

The reference images store 102 provides the classifier training system 100 with a set of reference images to use in training. The reference images comprise a plurality of blurry images, e.g., images not captured in focus, or images captured with a non-still camera (and hence suffering from motion blur).

The deblurring module 104 is used to deblur the reference images. Specifically, the deblurring module 104 applies a plurality of deblurring transformations to a blurry image, deriving a plurality of deblurred images from the blurry image. These deblurring transformations represent different alternative ways of deblurring, each possibly producing a deblurred image having a different level of deblurring quality. An example of a possible deblurring transformation is described in S. Cho, et al., *ACM Transactions on Graphics (SIGGRAPH ASIA* 2009), vol. 28, no. 5, article no. 145, December 2009, which is hereby incorporated herein by reference. In one embodiment, the different transformations can be from distinct deblurring algorithms; in other embodiments, the transformations are variations of the same deblurring algorithm (e.g., the same algorithm with different parameter values); in other embodiments, the transformations include both distinct deblurring algorithms and variations of the same deblurring algorithm.

The scoring module 106 scores each of the deblurred images produced by the deblurring module 104 from a given reference image. In various embodiments, the scoring module uses any image scoring system known in the art, and/or an image deblurring classifier previously produced by the classifier training system 100. The scoring module 106 receives and scores a plurality of deblurred images with respect to the blurry reference image from which they were deblurred. The scoring can comprise computing a score indicating the quality of deblurring, for example, mapping higher deblur quality to a high output score. Alternatively, the scoring module 106 can determine an ordered ranking for the deblurred images, with a first (or highest) ranked image having the highest deblur quality, and the last (or lowest) ranked image having the worst deblur quality. For simplicity, both the individual quality scores and the rank ordering will be referred to as "scores" henceforth. In some embodiments, such as when only poor quality or computationally slow scoring systems are available, the functionality of the scoring module 106 may be supplanted or augmented by operator(s) manually scoring the deblurred images.

In some embodiments, the classifier training system 100 comprises a sub-image extraction module 108 that extracts sub-images from the deblurred images. Each sub-image is capable of serving as a training sample—that is, as one of the inputs to the training module 112—and hence sub-image extraction serves to increase the total number of training samples, which in turn tends to increase accuracy of the resulting classifiers. In one embodiment, the sub-image extraction module 108 selects a plurality of regions (e.g., 100 pixels by 100 pixels) for each set of deblurred images, and for each selected region extracts the sub-image corresponding to the region from each of the deblurred images in the set. For example, if there were three deblurred images based on one reference image, then for each of the plurality of regions the sub-image extraction module would extract sub-images corresponding to that region from each of the three deblurred images. In order to minimize the bias in selecting the sub-images, in some embodiments the sub-image extraction module 108 randomly selects non-overlapping regions. In some embodiments, the sub-image extraction module instead selects regions of greatest variation between each of the deblurred images. For example, different deblurring transformations may affect the same image in different ways, and the regions showing the greatest variation between these deblurring transformations would be selected.

The feature extraction module 110 extracts features from the deblurred images for use in training the image deblurring classifiers 114. These features may comprise any of a plurality of image features known in the art (i.e. in the image domain), such as color features (e.g., hue and saturation in HSV color space), texture features (e.g., from a Gabor wavelet), edge features (e.g., those detected by a Canny edge detector), line features (e.g., those detected by a probabilistic Hough Transform), or SIFT (Scale Invariant Feature Transform), GLOH (Gradient Location and Orientation Histogram), LESH (Local Energy based Shape Histogram), or SURF (Speeded Up Robust Features). In one embodiment the feature extraction module 110 additionally employs a frequency domain transformation, which when applied to a deblurred image produces a frequency map which can be used for extracting additional frequency features (i.e. in the frequency domain) from the deblurred images. The features extracted by the feature extraction module may alternatively and/or additionally comprise features of the frequency map, such as the energy density of the frequency map. The feature extraction module produces feature vectors, which comprise at least one (and possibly many) types of features of the deblurred images, each feature vector containing numerical (e.g., real number) representations of the associated feature types.

The training module 112 trains an image deblurring classifier 114 using the image feature vectors produced by the feature extraction module 110 from the deblurred images and the corresponding scores of these images produced by the scoring module 106. Based on the image feature vectors and the scores, the classifier learns the image features indicative of well deblurred (e.g., high scoring) images. Once trained, the deblurring classifier 114 takes as input the feature vectors of a plurality of candidate deblurred images produced from a blurred image. This allows the classifier 114 to determine a score for each of the candidate deblurred images, and thereby select from the plurality of candidate deblurred images the "best" deblurred image.

Figure 2:
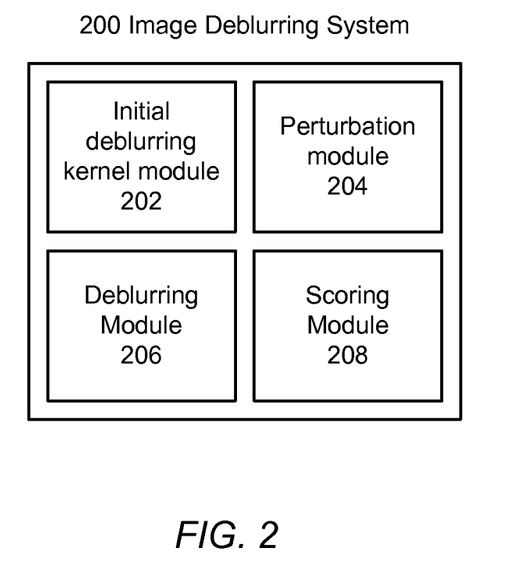
FIG. 2 is a block diagram of an image deblurring system, according to one embodiment.

Referring now to FIG. 2, illustrated is a block diagram of an image deblurring system 200, according to one embodiment. The image deblurring system receives as input a blurry image, and produces as output a deblurred version of that image, using one or more classifiers (e.g., the image deblurring classifier 114 generated by the classifier training system 100) to guide the deblurring. This process is illustrated later with reference to FIG. 4. The image deblurring system comprises an initial deblurring kernel module 202, a perturbation module 204, a deblurring module 206, and a scoring module 208. The initial deblurring kernel module 202 starts the process of deblurring an image by providing an initial deblurring kernel used to transform a reference (blurry) image into a deblurred image, and the perturbation module 204, deblurring module 206, and scoring module 208 iterate based on the initial deblurring kernel to optimize the process of deblurring an image.

The initial deblurring kernel module 202 produces an initial deblurring kernel for a blurry image. The initial deblurring kernel may be produced using any deblurring transformation known in the art, such as the transformation described in Cho, et al, supra. A deblurring kernel defines the linear transformation which transforms a blurry image into a deblurred image. A linear transformation describes, for each pixel in an image, a linear combination of the pixels in the blurry image to result in the deblurred image. The deblurring kernel may be a single linear transformation used for all pixels in the image (i.e. a global kernel), or it may be an individual linear transformation for each pixel in the image (i.e. a local kernel). In some embodiments, the deblurring kernel module 202 produces a global kernel for the reference image. In other embodiments, it produces a local kernel for each pixel.

The perturbation module 204 perturbs a deblurring kernel, such as the deblurring kernel produced by the initial deblurring kernel module 202 or the deblurring kernels produced by the perturbation module itself during a previous iteration, to produce one or more perturbed deblurring kernels. The one or more perturbed deblurring kernels are each different from the deblurring kernel received by the perturbation module 204. This allows for the image deblurring system 200 to iteratively evaluate the resulting quality of different deblurring kernels, and ultimately to select an optimal deblurring kernel for deblurring the image. In one embodiment, the perturbation module perturbs the deblurring kernel using simulated annealing with varying parameters for each perturbed deblurring kernel. Example parameters include variations in the temperature function or probability function. In other embodiments, the perturbation module perturbs the deblurring kernel by transposing it and/or by adding noise to it. Other possible perturbation algorithms may alternatively and/or additionally be employed, as would be known to those of skill in the art. The output of the perturbation module is the one or more perturbed deblurring kernels and is used by the deblurring module 206.

Figure 5:
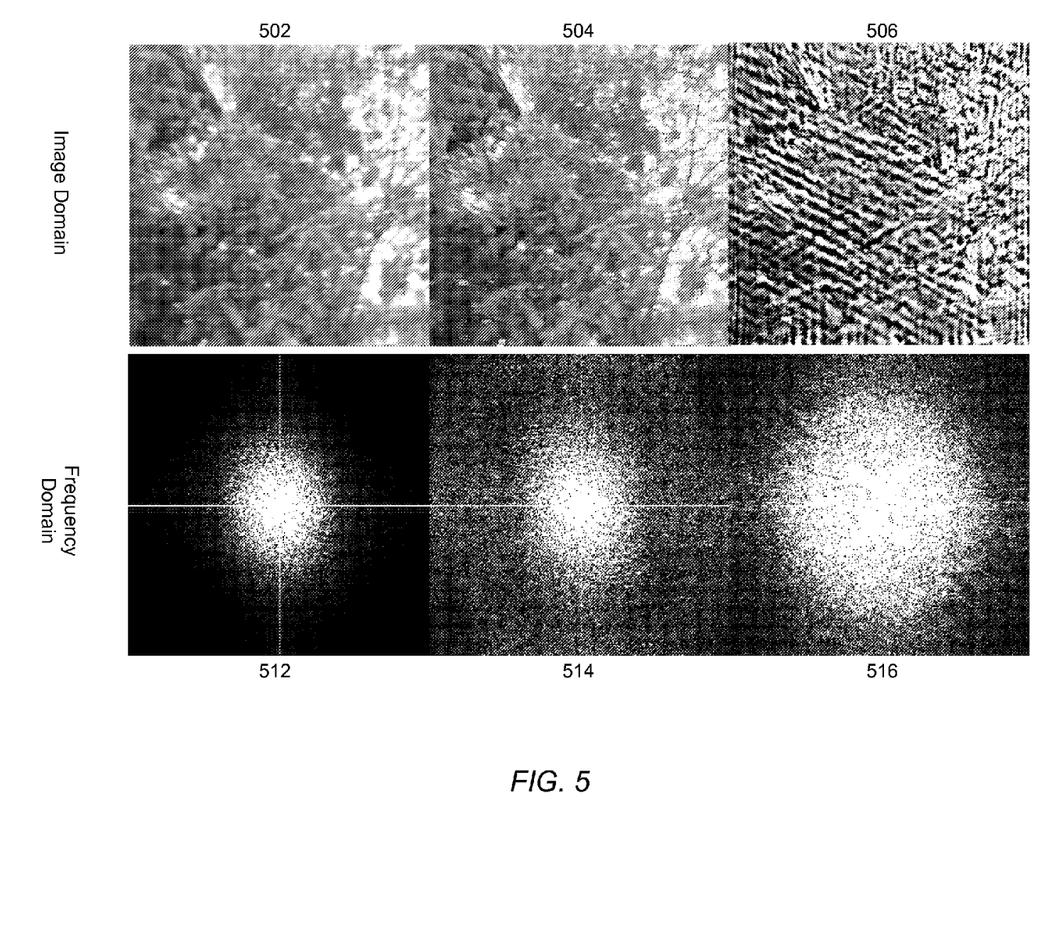
FIG. 5 illustrates an example blurry image and two deblurred versions of that image in both the image and frequency domains.

The deblurring module 206 deblurs a reference (blurry) image by applying a given image deblurring kernel—such as the deblurring kernel produced by the initial deblurring kernel module 202 or by the perturbation module 204—to the reference image. In one embodiment, the deblurring module 206 produces the deblurred image in the image domain (i.e., visually comprehensible to a human viewer in the same way as the reference image). Alternatively, in another embodiment, the deblurring module 206 produces the deblurred image in the frequency domain (i.e., a frequency transformation of an image describing the frequency characteristics of the image, such as a frequency map). FIG. 5 illustrates an example reference (blurry) image in the image domain 502 and in the frequency domain 512. FIG. 5 also illustrates two example deblurred images based on the reference image in the image domain 504 and 506, and the frequency domain 514 and 516, respectively. Computationally, in some instances, deblurring an image in the frequency domain is more efficient than deblurring the image in the image domain.

Referring again to FIG. 2, the scoring module 208 scores deblurred images produced by the deblurring module 206. The scoring module takes as input image feature vectors for one or more deblurred images and the original blurry image, and produces a score for the deblurred image(s) as output. As described above with respect to the scoring module 106, a score comprises a real valued metric, such as a quantitative measure or rank, by which the quality of the deblurred image can be quantified. In embodiments where the scoring module receives a plurality of deblurred images, the scoring module may output the scores for each of the plurality of deblurred images, or may output an ordered ranking for the deblurred images (e.g., ranked from 1 (highest rank) to N (lowest rank), where N is the number of input images.

Figure 3:
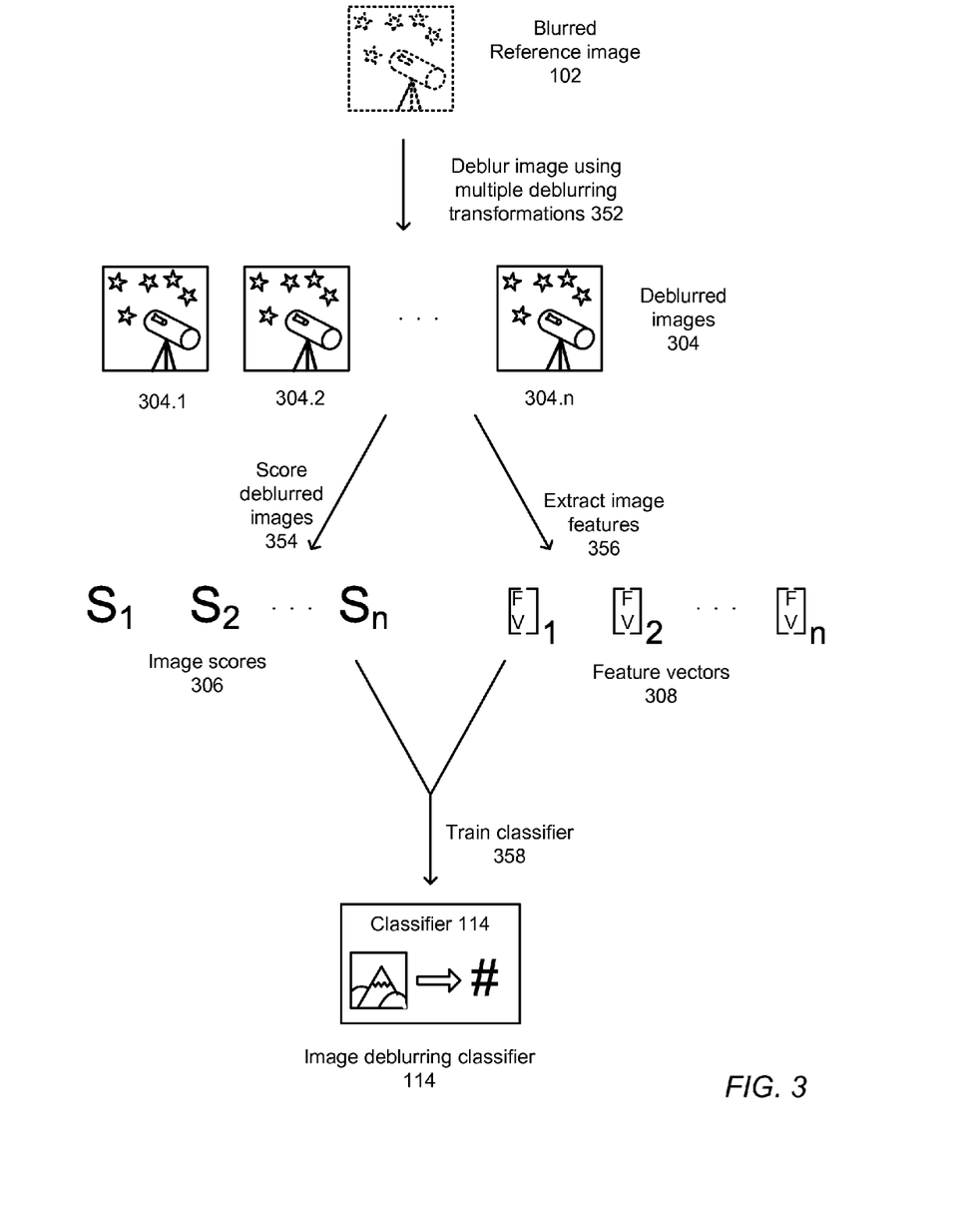
FIG. 3 is a data flow diagram representing the inputs and outputs of processes for training an image deblurring classifier, according to one embodiment.

FIG. 3 is a data flow diagram representing the operations performed by the training module 112 of FIG. 1 when training an image deblurring classifier 114, according to one embodiment. As explained in more detail below, the reference blurry images 102 are deblurred, and the deblurred counterparts are scored. The scores, along with feature vectors extracted from the deblurred images, is then used as input for training the image deblurring classifier 114. For the sake of clarity, FIG. 3 and the following discussion refer to only one reference image, but it is appreciated that any number of reference images could be employed.

First, a reference (blurry) image 102 is deblurred 352 by the deblurring module 104, as described above, using a plurality of deblurring transformations to produce a plurality of deblurred images 304.1, 304.2, . . . 304.n. Though n deblurred images 304 are shown for the reference image 102 in FIG. 3 for purposes of illustration, any number could be produced, each from a corresponding deblurring transformation.

The deblurred images 304 are scored 354 by the scoring module 106. Each deblurred image is given a score 306 indicating deblurring quality, as described above; for example, each deblurred image is depicted as being scored $S_1, S_2, \ldots, S_n$, respectively. These scores could represent quantitative measures of deblurring or a relative deblurring quality ranking.

In some embodiments, sub-images are extracted by the sub-image extraction module 108 (not illustrated in FIG. 3), and in such cases the sub-images serve as the deblurred images 304 produced by the scoring module 106.

Feature vectors 308 are extracted 356 from the deblurred images 304 by the feature extraction module 110, as described above. These feature vectors may comprise numerical representations of features in the image domain, the frequency domain, or both. This process is repeated for a large training set of blurred images (e.g., several thousand to several million blurred images).

Lastly, an image deblurring classifier 114 is trained 358 by the training module 112. As described above, the training module 112 uses both the image features 308 extracted by the feature extraction module 110 and the scores 306 produced by the scoring module 106. The classifier 114 learns to identify the image features that are indicative of a high scoring deblurred image. The training of the classifier 114 can follow conventional training protocols, for example by separating the deblurred images into training and validation sets, and sets having positive (e.g., high scoring) and negative (e.g., low scoring) examples.

Once trained the image classifier 114 can be used to identify a best deblurred image from a plurality of candidate deblurred images. Generally, a blurry image is accessed and a plurality deblur transformations are applied to the blurry image to produce a plurality of candidate deblurred images. The image feature vectors for each of these candidate deblurred images are extracted. The image feature vectors are input into the classifier 114, which puts either a score for each of the candidate deblurred images, or alternatively a ranking of the plurality of candidates. In either case, the classifier identifies the highest scored and hence highest quality or "best" deblurred candidate image.

Figure 4:
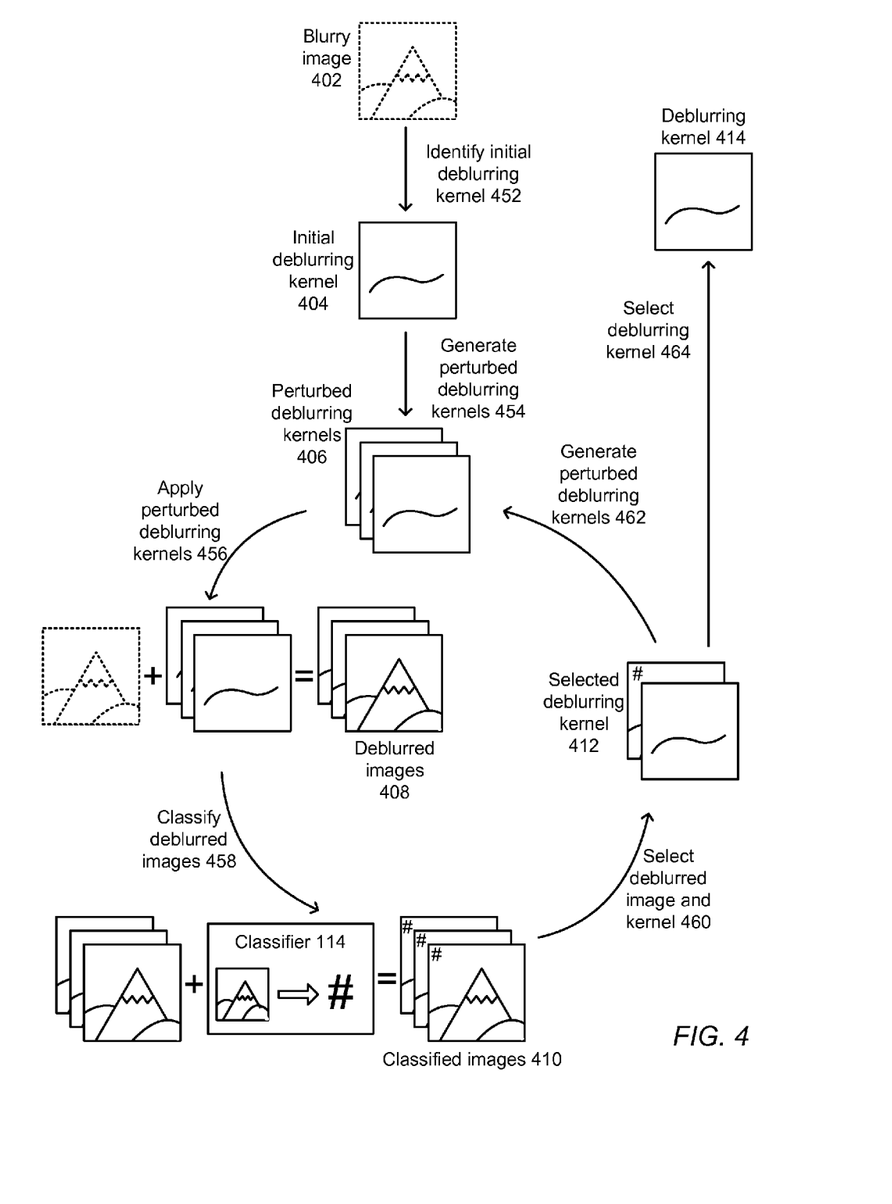
FIG. 4 is a data flow diagram representing the inputs and outputs of processes for applying an image deblurring classifier to deblur an image, according to one embodiment.

FIG. 4 is a data flow diagram representing the inputs and outputs of a process for deblurring an image using a classifier (e.g., the classifier 114 trained by the classifier training module 112), according to one embodiment. First, an initial deblurring kernel is produced by the image deblurring system 200 of FIG. 2 from a blurry image 402. As described above with respect to the perturbation module 204 and the deblurring module 206, the initial deblurring kernel is perturbed by a plurality of different transformations, and the perturbed deblurring kernels are used to deblur the blurry image. An image deblurring classifier 214 is used to score the deblurred images, and the highest scored deblurred image is selected, along with the kernel used to produce it. The selected kernel is then itself perturbed to produce second-degree perturbations, and the cycle continues iteratively. Finally, after a number of cycles, the highest scored deblurred image is selected as the highest-quality deblurring of the original blurry image 402. This process is now described in further detail.

First, a blurry image 402 is received. The blurry image is processed by the initial deblurring kernel module 202 to identify 452 an initial deblurring kernel 404 to use to deblur reference (blurry) images.

A plurality of perturbed deblurring kernels 406 are generated 454 by the perturbation module 204 based on the initial deblurring kernel 404, as described above with respect to FIG. 2.

The perturbed deblurring kernels 406 are applied 456 to the blurry image 402 by the deblurring module 206 to produce a plurality of deblurred images 408. Each perturbed deblurring kernel 406 will have an associated deblurred image. These deblurred images may be in the image domain (as illustrated in FIG. 4) or in the frequency domain. For example, in an embodiment in which the deblurring images are in the frequency domain, the deblurring module 206 first transforms the blurry image to the frequency domain using a frequency transform (e.g., a fast Fourier transform) prior to applying the deblurring kernel, which produces a deblurred image in the frequency domain.

The resulting deblurred images 408 are classified 458 by the scoring module 208 using an image deblurring classifier 114 to produce classified images 410. Each deblurred image receives a score corresponding to the quality of the image deblurring as described above with respect to the scoring module 208, and the best deblurred image and associated deblurring kernel 412 are selected 460. This selection may be done by the scoring module 208, or a different module.

The selected deblurring kernel 412 is perturbed to generate 462 a new plurality of perturbed deblurring kernels 406. The generation of these perturbed deblurring kernels may vary every time the cycle is completed. For example, the perturbation module 204 may downsample the deblurring kernel, such that a first cycle pass may be performed at 20% resolution, a second cycle pass may be performed at 40%, and so on. Alternatively, various perturbation methods may be used, or the parameters of the perturbation methods may be varied.

After some number of cycles (comprising the steps 456, 458, 460, and 462) have passed, instead of repeating the cycle, the process terminates and a final deblurring kernel 414 is selected 464. In some embodiments, the process terminates when the selected deblurring kernel meets a predetermined quality threshold (e.g., the quality score of the deblurred image associated with that deblurring kernel is above a minimum threshold); in other embodiments, the process terminates when a predetermined number of cycles have been completed. The selected deblurring kernel 414 may then be applied to the blurry image 402 by (for example) the deblurring module 206 to produce a final high-quality deblurred image.

In summary, an image deblurring system applies a number of deblurring transformations to a given blurry reference image and uses the classifier trained by the classifier training system to evaluate deblurring quality, thereby finding a highest-quality deblurred image. In some embodiments, the deblurring transformations are determined iteratively using simulated annealing. In some embodiments, the image deblurring system performs the image deblurring in the frequency domain using the classifier trained by the classifier training system to evaluate deblurring quality in the frequency domain. This allows more computationally efficient deblurring operations in many instances.

The Figures (FIGS.) and the description relate to preferred embodiments by way of illustration only. It should be noted that from the above discussion, alternative embodiments of the structures and methods disclosed will be readily recognized as viable alternatives that may be employed without departing from the principles of what is claimed.

It is noted that wherever practicable similar or like reference numbers are used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory), for example, as described and illustrated with FIG. 3 and FIG. 4. These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for more efficiently handling shared code stored in memory, through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A machine-readable non-transitory storage medium encoded with instructions that, when executed by a processor, cause the processor to perform a method comprising:
   generating a plurality of perturbed deblurring kernels by perturbing a first deblurring kernel;
   applying each of the plurality of perturbed deblurring kernels to a blurry image to produce a plurality of deblurred images;
   determining a plurality of deblurring scores by applying a classifier to each of the plurality of deblurred images;
   selecting, using the plurality of deblurring scores, one of the plurality of perturbed deblurring kernels, as the selected deblurring kernel;
   applying a frequency domain transform to the blurry image; and
   applying the selected deblurring kernel to the blurry image to produce a deblurred image.

2. The medium of claim 1, wherein plurality of perturbed deblurring kernels are generated using simulated annealing with varying parameters for each of the perturbed deblurring kernels.

3. A machine-readable non-transitory storage medium encoded with instructions that, when executed by a processor, cause the processor to perform a method comprising:
   generating a first perturbed deblurring kernel by perturbing a first deblurring kernel;
   generating a second perturbed deblurring kernel by perturbing one of the first deblurring kernel and the first perturbed deblurring kernel;
   applying the first perturbed deblurring kernel to a blurry image to produce a first deblurred image;
   applying the second perturbed deblurring kernel to the blurry image to produce a second deblurred image;

determining a first deblurring score by applying a classifier to the first deblurred image;
determining a second deblurring score by applying the classifier to the second deblurred image; and
selecting, using the first deblurring score and the second deblurring score, one of the first perturbed deblurring kernel and the second perturbed deblurring kernel as the deblurring kernel.

4. The medium of claim 3, further comprising applying the deblurring kernel to the blurry image to produce a deblurred image.

5. The medium of claim 3, wherein first perturbed deblurring kernel and the second perturbed deblurring kernel are generated using simulated annealing with varying parameters for each of the perturbed deblurring kernels.

6. The medium of claim 3, further comprising:
generating a third perturbed deblurring kernel based on one or more of the first deblurring kernel, the first perturbed deblurring kernel, and the second perturbed deblurring kernel; and
determining a third deblurring score by applying the classifier to the second deblurred image.

7. The medium of claim 6, further comprising:
selecting, using the first deblurring score, the second deblurring score, and the third deblurring score, one of the first perturbed deblurring kernel, the second perturbed deblurring kernel, and the third perturbed deblurring kernel as the deblurring kernel.

8. The medium of claim 3, wherein identifying a first deblurring kernel based on a blurry image additionally comprises applying a frequency domain transform to the blurry image.

9. The medium of claim 3, wherein generating the first perturbed deblurring kernel comprises applying a first transform to the first deblurring kernel, and wherein generating the second perturbed deblurring kernel comprises applying a second transform to one of the first deblurring kernel and the first perturbed deblurring kernel.

10. The medium of claim 3, wherein applying the first perturbed deblurring kernel to the blurry image to produce a first deblurred image comprises:
applying a frequency domain transform to the blurry image;
applying a frequency domain transform to the first perturbed deblurring kernel; and
producing the first deblurred image in the frequency domain.

11. The medium of claim 3, wherein the classifier is trained by:
applying a plurality of deblur transformations to a plurality of blurry references images thereby producing a plurality of deblurred images;
scoring each of the plurality of deblurred images;
determining an image feature vector characterizing one or more visual aspects of the image; and
training the classifier based on the image feature vectors from the deblurred images and the corresponding scores of the deblurred images.

12. A computer-implemented method, the method comprising:
generating a first perturbed deblurring kernel by perturbing a first deblurring kernel;
generating a second perturbed deblurring kernel by perturbing one of the first deblurring kernel and the first perturbed deblurring kernel;
applying the first perturbed deblurring kernel to the blurry image to produce a first deblurred image;
applying the second perturbed deblurring kernel to the blurry image to produce a second deblurred image;
determining a first deblurring score by applying a classifier to the first deblurred image;
determining a second deblurring score by applying the classifier to the second deblurred image; and
selecting, using the first deblurring score and the second deblurring score, one of the first perturbed deblurring kernel and the second perturbed deblurring kernel as the deblurring kernel.

13. The method of claim 12, further comprising applying the deblurring kernel to the blurry image to produce a deblurred image.

14. The method of claim 12, wherein first perturbed deblurring kernel and the second perturbed deblurring kernel are generated using simulated annealing with varying parameters for each of the perturbed deblurring kernels.

15. The method of claim 12, further comprising:
generating a third perturbed deblurring kernel based on one or more of the first deblurring kernel, the first perturbed deblurring kernel, and the second perturbed deblurring kernel; and
determining a third deblurring score by applying the classifier to the second deblurred image.

16. The method of claim 15, further comprising:
selecting, using the first deblurring score, the second deblurring score, and the third deblurring score, one of the first perturbed deblurring kernel, the second perturbed deblurring kernel, and the third perturbed deblurring kernel as the deblurring kernel.

17. The method of claim 12, wherein identifying a first deblurring kernel based on a blurry image additionally comprises applying a frequency domain transform to the blurry Image.

18. The method of claim 12, wherein generating the first perturbed deblurring kernel comprises applying a first transform to the first deblurring kernel, and wherein generating the second perturbed deblurring kernel comprises applying a second transform to the first deblurring kernel.

19. The method of claim 12, wherein applying the first perturbed deblurring kernel to the blurry image to produce a first deblurred image comprises:
applying a frequency domain transform to the blurry image;
applying a frequency domain transform to the first perturbed deblurring kernel; and
producing the first deblurred image in the frequency domain.

20. The method of claim 12, wherein the classifier is trained by:
applying a plurality of deblur transformations to a plurality of blurry references images thereby producing a plurality of deblurred images;
scoring each of the plurality of deblurred images;
determining an image feature vector characterizing one or more visual aspects of the image; and
training the classifier based on the image feature vectors from the deblurred images and the corresponding scores of the deblurred images.

* * * * *